Dec. 16, 1941. W. G. MARTIN 2,266,610
HOT WATER TANK CONNECTION
Filed May 18, 1940
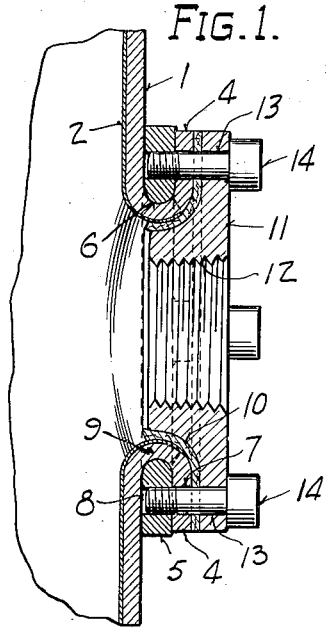
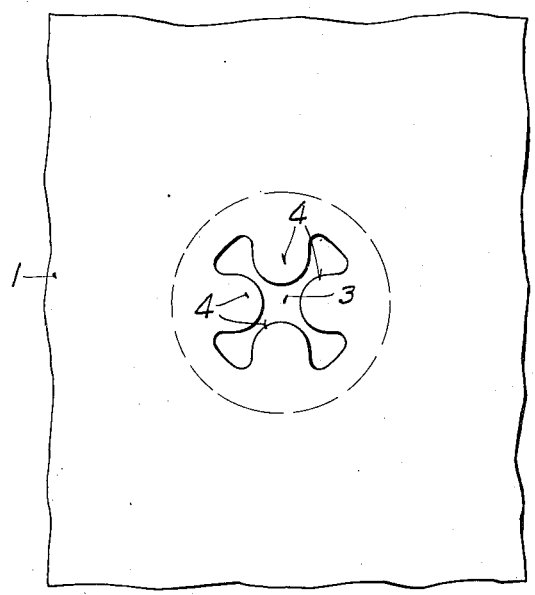
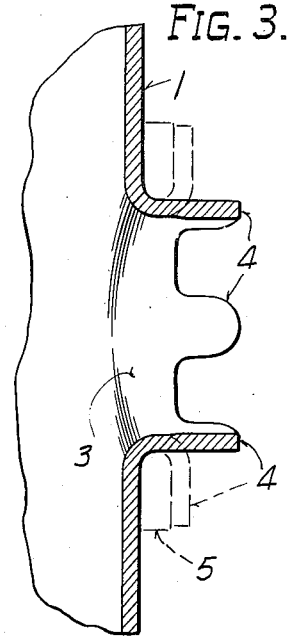
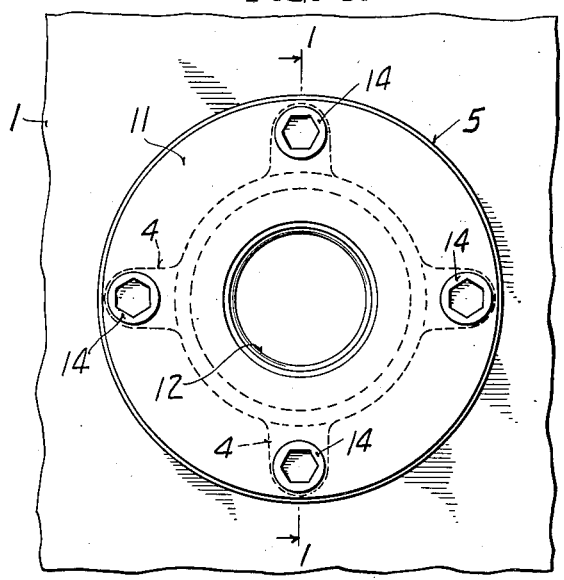
Wesley G. Martin
INVENTOR.
BY
ATTORNEY.

Patented Dec. 16, 1941

2,266,610

UNITED STATES PATENT OFFICE 2,266,610

HOT WATER TANK CONNECTION

Wesley G. Martin, Milwaukee, Wis., assignor to A. O. Smith Corporation, Milwaukee, Wis., a corporation of New York Application May 18, 1940, Serial No. 335,997

4 Claims. (Cl. 285—49)

This invention relates to a hot water tank connection, and more particularly to a connection for securing pipes to tanks that are lined with glass or similar lining material.

The object of the invention is to provide a connection which can be readily applied to the tank without injuring the glass or enamel.

Another object is to provide a connection which is sealed without welding and which can be readily replaced.

Other objects and advantages will be pointed out in connection with the description of the preferred embodiment which is illustrated in the accompanying drawing.

In the drawing:

Figure 1 is a section through the connection on line 1—1 of Fig. 4 showing the fastening means and the wall of the tank;

Fig. 2 is a plan view of the opening in the tank wall after blanking;

Fig. 3 is a view similar to Fig. 2 showing the opening after the preliminary flanging operation; and Fig. 4 is a similar view showing the finished connection.

In carrying this invention into practice, the tank is provided with a flanged opening adapted to have a screw threaded connection or fitting bolted to it for making connection to water pipes. To produce the flanged opening, the tank wall 1 is blanked, before enameling, to provide an irregular shaped opening 3 having inwardly projecting ears 4, preferably four as shown in Fig. 2.

In the next operation a ring plate 5 of substantial thickness and having a smooth round inner edge 6 is applied to the outside of the tank and centered with respect to the opening 3. Then the tank wall is flanged outwardly at the opening and the ears 4 are bent over the plate 5 to engage the outer face of the plate.

A hole 7 is provided in each ear 4 and after forming as above set forth each hole 7 registers with a threaded hole 8 in the plate 5.

The edge of the tank wall is bent during the forming to provide a curved flange 9 around the opening having a more or less tapering outer surface for receiving a sealing gasket 10.

The tank having been thus provided with a flanged opening and otherwise made ready for enameling, enamel frit is applied to the interior surface of the tank and to the opening and fused thereon to form an enamel lining 2 which extends out to and covers the tapering outer surface provided to engage with the sealing gasket 10.

The cover plate 11 which completes the connection has a central threaded opening 12 for receiving the pipe or other member to be applied to the tank, and holes 13 near its outer periphery corresponding in number and location to the holes 7 and 8. The inner face of the plate 11 has its outer corner chamfered on a curve or taper corresponding with the curvature or taper of the flange 9 and the ears 4.

The sealing gasket 10 comprises a flexible compressible ring of material which is resistant to hot water corrosion and capable of sealing the connection against leakage. Gaskets of certain types of asbestos compositions and of certain resins and rubber compositions may be used. It it also possible to use a soft metal gasket. However, in case electrolysis is to be encountered the gasket should be of insulating material and the joint can be made entirely insulated.

Bolts 14 pass through holes 7 and 13, the gasket 10 and thread into holes 8 in the plate 5 to secure the parts together. In case an insulated joint is desired, the bolts may readily be insulated from the plate 11. The bolts 14 are preferably sufficiently short to allow some tolerance in tightening the connection against the gasket without danger of the end of the bolts engaging the tank wall. The taper or curvature of flange 9 and the complementary inner face of plate 11 effects a tight seal with the gasket 10 when the bolts 14 are tightened.

Various embodiments of the invention may be employed within the scope of the accompanying claims.

The invention is claimed as follows:

1. A tank connection comprising a circular flange formed from the thin wall of the tank and having an outwardly curved or tapered surface for receiving a gasket, a cover plate having an inner face complemental to the outer surface of the flange, a stiff ring surrounding said flange and holding it in shape, and means to secure said plate in place to compress the gasket and seal the joint.

2. A tank connection comprising a circular flange formed from the thin wall of the tank and having an outwardly curved or tapered surface for receiving a gasket, ears on said flange bent parallel to the tank wall, a cover plate having an inner face complemental to the outer surface of the flange, a stiff ring surrounding said flange and holding it in shape, and bolts passing through said plate and ears and threaded into said ring to secure the parts together.

3. A tank connection comprising a circular flange formed from the thin wall of the tank and having an outwardly curved or tapered surface for receiving a gasket, a cover plate having an inner face complemental to the outer surface of the flange, a stiff ring surrounding said flange and holding it in shape, and means to secure said plate to said ring to compress the gasket and seal the joint between the plate and the flange.

4. A tank connection comprising a circular flange formed from the thin wall of the tank and having an outwardly flared rim portion, ears integral with the flange and bent substantially normal to the axis of the flange, a connecting member having a surface complemental to the outwardly flared rim for making a substantially tight joint therewith, a stiff reenforcing ring beneath said ears and backing said flared rim to support it against the pressure of said connecting member, and means passing through said connecting member, said ears and into said ring for securing said parts together.

WESLEY G. MARTIN.